United States Patent [19]

Nagata et al.

[11] Patent Number: 5,025,342
[45] Date of Patent: Jun. 18, 1991

[54] THIN-FILM MAGNETIC HEAD DEVICE FOR RECORDING AND REPRODUCING

[75] Inventors: Yuji Nagata, Yao; Toshio Fukazawa, Kyoto, both of Japan

[73] Assignee: Matsushita Electric Industrial Co., Ltd., Osaka, Japan

[21] Appl. No.: 567,812

[22] Filed: Aug. 15, 1990

[30] Foreign Application Priority Data

Aug. 24, 1989 [JP] Japan ................................. 1-218001

[51] Int. Cl.⁵ .............................................. G11B 5/147
[52] U.S. Cl. ................................................... 360/126
[58] Field of Search ............................ 360/126, 113

[56] References Cited

U.S. PATENT DOCUMENTS 4,780,779 10/1988 Pisharody ...................... 360/126 X

FOREIGN PATENT DOCUMENTS 52-12814 1/1977 Japan .
61-48116 3/1986 Japan .

Primary Examiner—A. J. Heinz
Attorney, Agent, or Firm—Stevens, Davis, Miller & Mosher

[57] ABSTRACT

A magnetic head device of thin-film type having superior recording and reproducing characterisics. The magnetic head device has a non-magnetic substrate and lower and upper magnetic layers formed on the substrate. At least one of the magnetic layers has a double-layered structure composed of two soft magnetic layers. One of these soft magnetic layers, which is disposed at the inner side of the magnetic circuit, has a coercive force smaller than that of the other soft magnetic layer. The soft magnetic layer having the greater coercive force, at least at a portion thereof contactable with the recording medium, has a greater width than the soft magnetic layer of the smaller coercive force as viewed in the direction of the track.

6 Claims, 4 Drawing Sheets

THIN-FILM MAGNETIC HEAD DEVICE FOR RECORDING AND REPRODUCING

BACKGROUND OF THE INVENTION

The present invention relates to a magnetic head device and, more particularly, to a magnetic head device of thin-film type.

In general, a known magnetic head device of a thin film type has a lower magnetic layer made of a soft magnetic material, a gap made of a non-magnetic material and an upper magnetic layer which are laminated in the mentioned order on a substrate made of a non-magnetic material, so as to form a ring-like magnetic circuit. At the same time, a coil is arranged to wind around with this magnetic circuit.

When the magnetic head device is used for a recording purpose, a signal current is supplied to the coil so that a magnetic field is generated at the gap in accordance with the signal current, so that the signals are magnetically recorded in a recording medium by the magnetic field. Conversely, when the magnetic head device is used for reproducing purpose, a signal magnetic field introduced through the gap is detected by the coil.

In the conventional thin-film magnetic head device of winding type, the same magnetic structure is driven both in the recording and the reproduction. This means that the track width is the same both in the recording and reproducing phases, so that the recording and reproducing performance is often impaired due to the following reasons.

In general, a magnetic head device inevitably exhibits an off-track due to a running offset during running of the recording medium. Representing the track width of the thin-film magnetic head by T and the amount of running offset of the recording medium by ±a, the deviation of the track between the recording phase and the reproducing phase is 2a at the maximum. In such a case, the effective reproduction track width is reduced to (T−2a), so that the reproduction output is decreased undesirably.

SUMMARY OF THE INVENTION

Accordingly, an object of the present invention is to provide a magnetic head device having superior recording and reproducing performance, thereby overcoming the above-described problems of the prior art.

To this end, according to the present invention, there is provided a magnetic head device comprising, at least, a substrate, a lower magnetic layer formed on the substrate, an upper magnetic layer which forms a gap at its one end adjacent to the surface of the lower magnetic layer for making sliding contact with a recording medium and completing a magnetic coupling at its other end, and a conductive coil which winds around the magnetic circuit formed by the lower and upper magnetic layers, wherein at least one of the lower and upper magnetic layers has a double-layered soft magnetic structure composed of two soft magnetic layers having different levels of coercive force, such that one of the soft magnetic layers which is located on the inner side of the magnetic circuit has a coercive force smaller than that of the other soft magnetic layer.

The arrangement described above makes it possible to employ different track widths during recording and reproduction, so that the thin-film magnetic head device can maintain the on-track condition regardless of any running offset during recording and reproduction, whereby recording and reproduction are performed stably without causing any reduction in the reproduction output.

DESCRIPTION OF THE PREFERRED EMBODIMENTS

Figure 1:
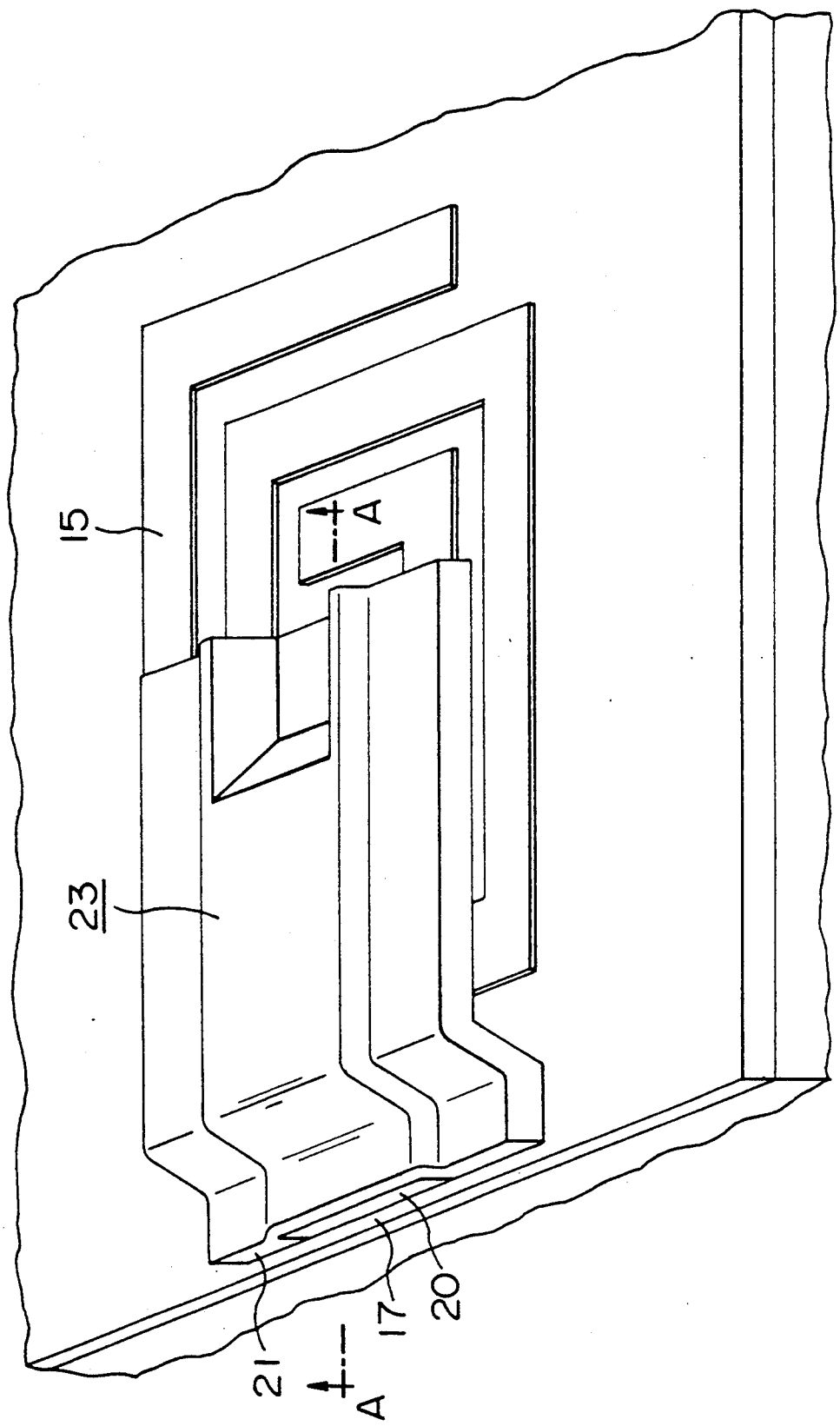
FIG. 1 is a schematic perspective view of a first embodiment of the magnetic head device of the present invention.
Figure 2:
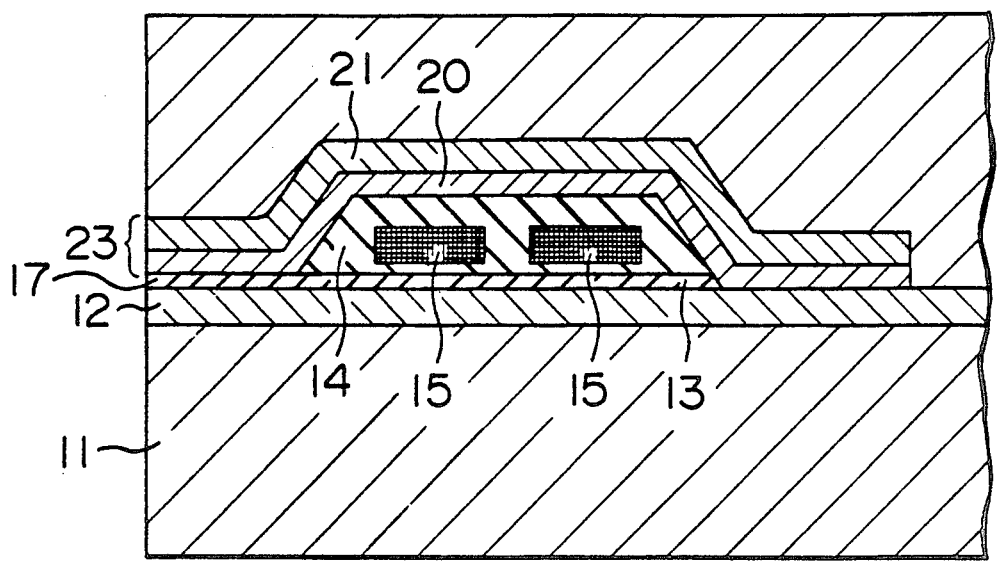
FIG. 2 is a sectional view taken along the line A—A of FIG. 1.

Referring to FIGS. 1 and 2, a magnetic head device as a first embodiment of the present invention has a substrate 11 made of a non-magnetic material on which are successively formed a lower magnetic layer 12 made of a soft magnetic material, a first insulating layer 17 made of a non-magnetic material, and an upper magnetic layer 23. The first insulting layer 17 forms a gap by the upper and lower magnetic layers at an abutting portion of recording medium thereon. The second insulating layer 14 is provided between the first insulting gap layer 17 and the upper magnetic layer 23 so as to be enveloped by these two layers. A conductive coil 15 is embedded in the second insulating layer 14.

Figure 3:
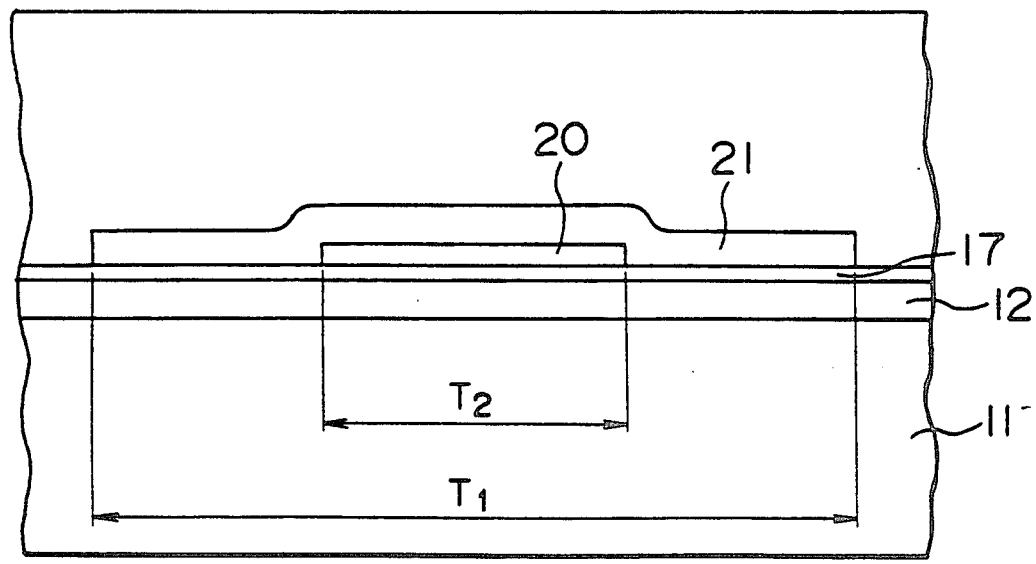
FIG. 3 is a front elevational view of the magnetic head device of FIG. 1 as viewed from the side contactable with a recording medium.

The upper magnetic layer 23 is composed of two layers: namely, a soft magnetic layer 20 disposed on the lower side and having a small coercive force and a soft magnetic layer 21 disposed on the upper side and having a large coercive force. Referring to FIG. 3, the breadth of the soft magnetic layer 20 is determined to provide a predetermined reproduction track width T2, while the breadth of the coercive layer 21 is determined to provide a predetermined recording track width T1.

The operation of this embodiment will be described with reference to FIG. 2. When the magnetic head device is used for recording, a recording current is supplied to the conductive coil 15 so as to produce a magnetic field which is introduced to the gap 17 through a magnetic circuit formed by the lower magnetic layer 12 and the upper magnetic layer 23 composed of the soft magnetic layers 20, 21, whereby signals carried by the recording current are recorded in a recording medium. The intensity of the recording magnetic field is much greater than the coercive forces of the soft magnetic layers 20, 21 so that the magnetic field equally penetrates these two soft magnetic layers, so that the recording is conducted with a recording pattern width T1 (see FIG. 3).

When the magnetic head device is used for reproducing purpose, a signal magnetic field from the magnetic recording medium is introduced from the upper magnetic layer 23. The intensity of the signal magnetic field, however, is so small that the most part of this magnetic field penetrates the soft magnetic layer 20 having a smaller coercive force. Thus, the reproduction is conducted with a reproduction track width T2.

According to the invention, it is possible to employ different track widths in the recording and reproduction phases with the same single magnetic head device. It is therefore possible to eliminate any reduction in the reproduction output due to off-tracking, regardless of any possible running offset of the recording medium between the recording phase and the reproducing phase.

It may occur that the soft magnetic layer partially invades an adjacent rack, depending on the magnitude of the turning offset of the recording medium. However, magnetic flux from the adjacent track doe not come into the magnetic head device because the soft magnetic layer 21 has a large coercive force, so that crosstalk can be avoided advantageously.

Figure 4:
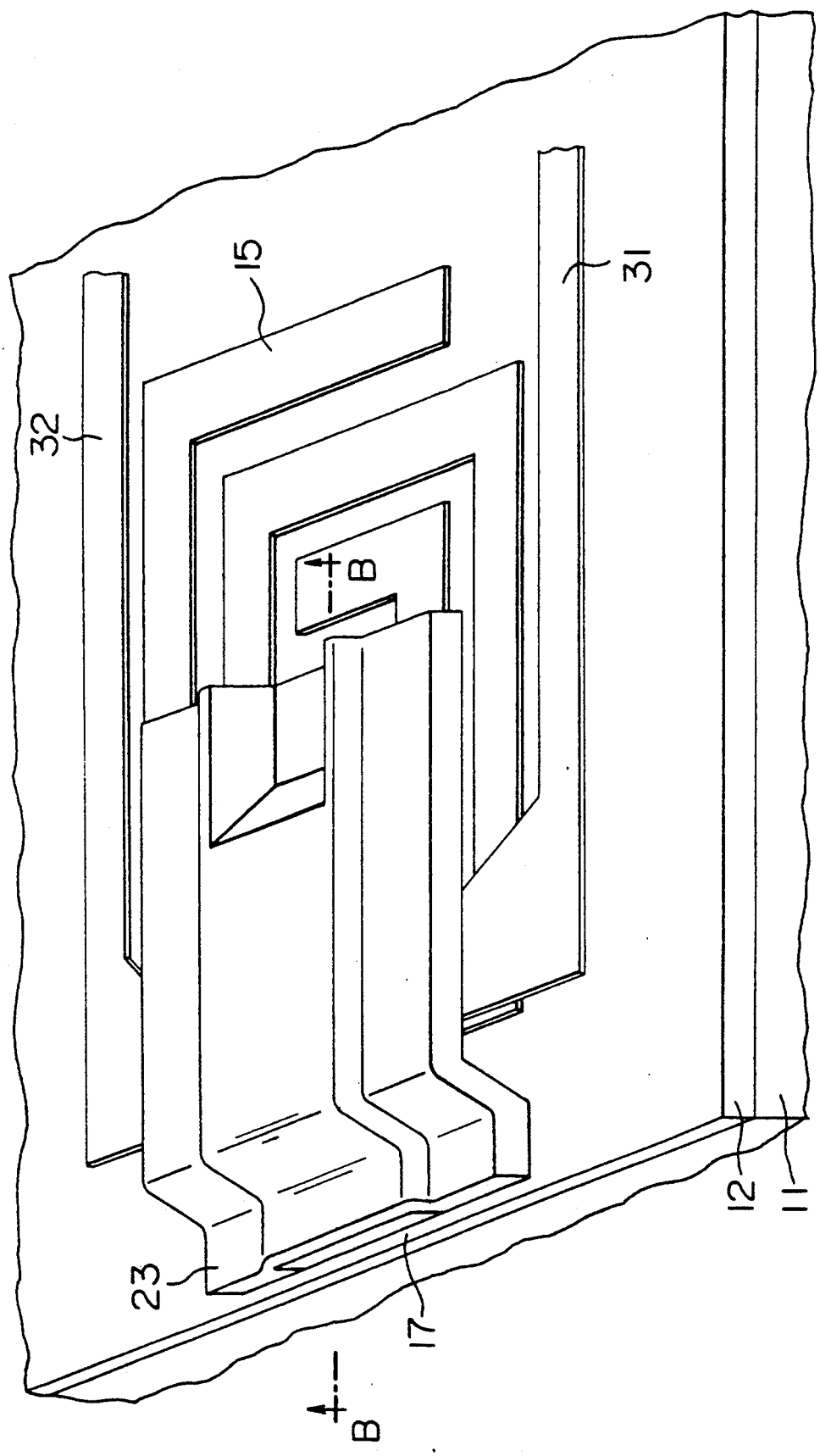
FIG. 4 is a schematic perspective view of a second embodiment of the magnetic head device of the present invention.
Figure 5:
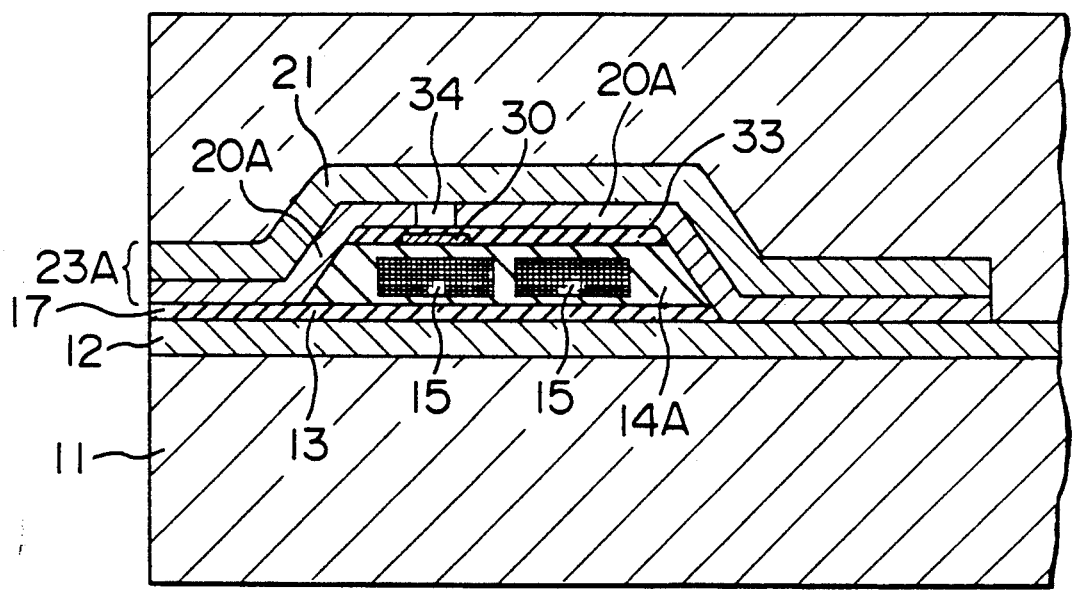
FIG. 5 is a sectional view taken along the line B—B of FIG. 4.

A description will now be given of a second embodiment of the invention with reference to FIGS. 4 and 5. Referring particularly to FIG. 5, the second embodiment of the magnetic head device of the present invention has a third insulating layer 33 formed on the upper side of the second insulating layer 14 of the structure shown in FIG. 2. A magneto resistive element 30 made of a thin film of a Ni-Fe film or Ni-Co film, is provided on the underside of the third insulating layer 33 so as to contact the second insulating layer 14A. The magnetic head device also has a of magnetic layer 20A which is substantially the same as the soft magnetic layer 20 of FIG. 2 except that it is partly notched as at 34. The notch 34 is disposed above the magneto resistive element 30. The magneto resistive element 30 is adapted to be supplied with electrical driving power through electrodes 31 and 32 shown in FIG. 4.

The operation of the second embodiment of the magnetic head device will be described with specific reference to FIG. 5. When the magnetic head device is used for recording, a recording current is supplied to the conductive coil 15 so as to produce a magnetic field which is introduced to the gap 17 through a magnetic circuit composed of the soft magnetic layer 21 having a large coercive force and the lower magnetic layer 12, whereby the signals are recorded in a recording medium. Thus, the cording is conducted with a recording pattern width T1 which is the same as that of the soft magnetic layer 21 (see FIG. 3).

When the magnetic head device is used for reproducing purpose, a signal magnetic field from the recording medium is introduced to the magnetic resistance element 30 through the soft magnetic layer 20 of small coercive force, whereby the reproduction is conducted with a reproduction track width T2 which is equal to the width of the soft magnetic layer 20.

In the first and second embodiments as described, a lower magnetic layer is formed on a substrate made of a non-magnetic material. This, however, is only illustrative and the combination of the non-magnetic substrate and the lower magnetic layer may be substituted by a ferromagnetic substrate.

As will be understood from the foregoing description, according to the invention, it is possible to employ different track widths for recording and reproduction with a single magnetic head device, thus offering remarkable advantages such as elimination of a reduction in the reproduction output regardless of any running offset of the recording medium and increase in the cross-talk.

In general, magnetic recording of digital signals is conducted with a magnetic field intensity of 1000 A/m or greater, while the intensity of the signal magnetic field derived from a recording medium is as low as 80 A/m or less. Therefore, by using a double-layered structure composed of a soft magnetic layer of 80 A/m or greater and a soft magnetic layer of 80 A/m or less, it is possible to introduce the signal magnetic field from the recording medium only to the soft magnetic layer having a smaller coercive force, thus enhancing the above-described advantages of the invention.

What is claimed is:

1. A magnetic head device comprising, at least, a substrate, a lower magnetic layer formed on said substrate, an upper magnetic layer which forms a magnetic gap at its one end adjacent to the surface of said lower magnetic layer for making sliding contact with a recording medium and a magnetic coupling at its other end, and a conductive coil which winds around the magnetic circuit formed by said lower and upper magnetic layers, wherein at least one of said lower and upper magnetic layers has a double-layered soft magnetic structure composed of two soft magnetic layers having different levels of coercive force, such that one of the soft magnetic layers which is located on the inner side of said magnetic circuit has a coercive force which is smaller than that of the other soft magnetic layer.

2. A magnetic head device according to claim 1, wherein the width of the soft magnetic layer having the greater coercive force, at least at the portion thereof contactable with the recording medium, is greater than the width of the soft magnetic layer having the smaller coercive force as viewed in the direction of the track.

3. A magnetic head device according to claim 2, wherein a part of the one of said soft magnetic layers having the smaller coercive force is cut-away and substituted by a magneto resistive element and electrode means are provided for supplying driving electric current to the magneto resistive element.

4. A magnetic head device according to claim 3, wherein one of said soft magnetic layers of said two-layered soft magnetic layer has a coercive force of 80 A/m or less, while the other of said soft magnetic layers has a coercive force of 80 A/m or greater, wherein said coercive force of said one of said layers and said coercive force of said other of said layers cannot both be 80 A/m simultaneously.

5. A magnetic head device according to claim 2, wherein one of said soft magnetic layers of said two-layered soft magnetic layer has a coercive force of 80 A/m or less, while the other of said soft magnetic layers has a coercive force of 80 A/m or greater, wherein said coercive force of said one of said layers and said coercive force of said other of said layers cannot both be 80 A/m simultaneously.

6. A magnetic head device according to claim 1 wherein one of said soft magnetic layers of said two-layered soft magnetic layer has a coercive force of 80 A/m or less, while the other of said soft magnetic layers has a coercive force of 80 A/m or greater, wherein said coercive force of said one of said layers and said coercive force of said other of said layers cannot both be 80 A/m simultaneously.

* * * * *